July 31, 1962                J. E. HARVEY ET AL                3,046,833
                              FILM GATE MECHANISM
                              Filed May 28, 1959
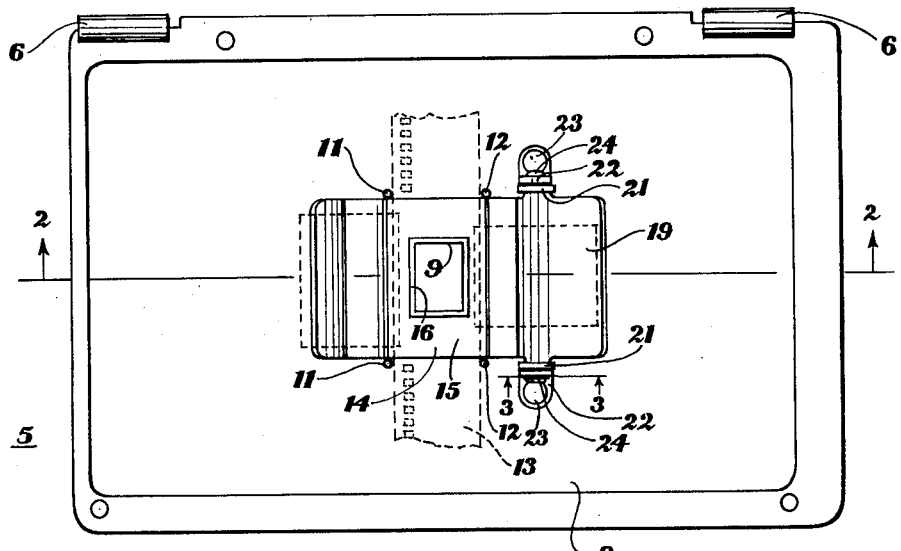
Fig. 1
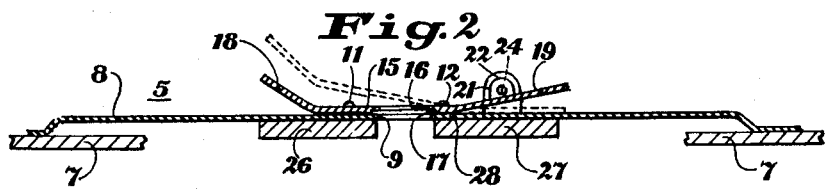
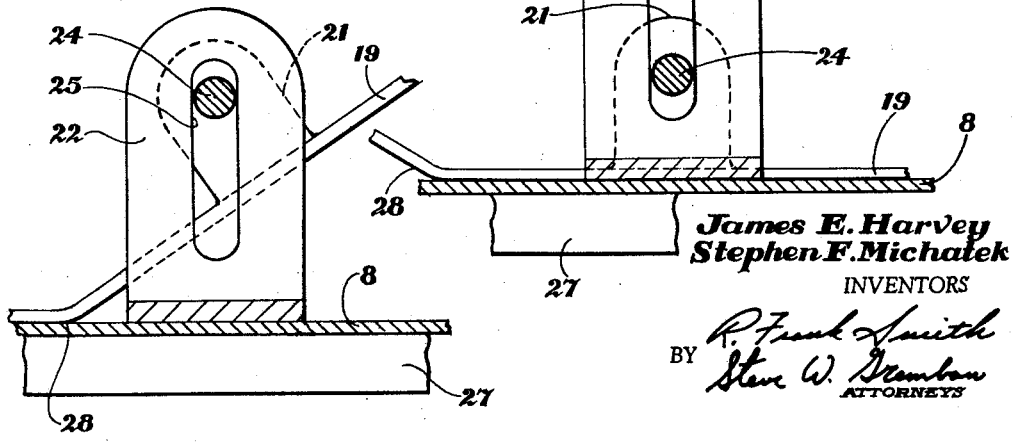
James E. Harvey
Stephen F. Michalek
INVENTORS
BY
ATTORNEYS

United States Patent Office 3,046,833
Patented July 31, 1962

1

3,046,833
FILM GATE MECHANISM
James E. Harvey and Stephen F. Michatek, Rochester,
N.Y., assignors to Eastman Kodak Company, Rochester, N.Y., a corporation of New Jersey
Filed May 28, 1959, Ser. No. 816,478
6 Claims. (Cl. 88—17)

This invention relates generally to photography, and more specifically to an improved film gate mechanism for photographic apparatus.

The provision of a film gate mechanism for photographic apparatus such as a printer, moving-picture projector, camera, and the like, for guiding and maintaining a film in proper relation to the optical system, are well known in the art. Most of the film gate mechanisms in the prior art are constructed of many parts manufactured to close tolerances and hence are relatively complicated and expensive, and further employ a spring device for urging the pressure plate of the gate mechanism into an operative or film-guiding position in engagement with the supporting aperture plate. The spring device is objectionable to some extent in that after a period of use they become weak and ineffective for their intended purpose and therefore must be either readjusted or entirely replaced. Also, it is extremely difficult to maintain uniform tension with a spring device. In addition, an expensive and relatively complicated latch mechanism is required for releasably holding the gate mechanism in an inoperative or film-threading position against the bias of the spring device. A further disadvantage of most of the prior art film gate mechanisms are that they are relatively noisy in operation, and the moving parts are readily susceptible to wear, requiring readjustment or replacement of the gate mechanism.

Therefore, one of the primary objects of this invention is to provide an improved film gate mechanism that is of simple design and construction, thoroughly reliable and efficient in operation, and economical to manufacture.

Another object of this invention is the provision of an improved film gate mechanism that is relatively noiseless in operation.

One more object of this invention is to provide an improved film gate mechanism adapted to maintain substantially uniform tension on the film at all times.

Another object of the invention is the provision of an improved film gate mechanism which will not scratch or otherwise mar the film.

Another object of the invention is to provide an improved film gate mechanism that eliminates the need for an expensive and complicated latch mechanism for releasably holding the film gate in an inoperative or film-threading position.

Still another object of this invention is to provide an improved film gate mechanism in which the parts may be stamped out by a stamping machine without sacrificing precision and reliability.

A further object of the invention is to provide a film gate mechanism that may be rapidly and relatively effortlessly moved between an operative or film-guiding position and an inoperative or film-threading position.

Another object of the invention is to provide an improved film gate mechanism having a pin and slot connection between the aperture and pressure plates to assure complete and proper seating of the pressure plate on the aperture plate.

Still another object of this invention is to provide an improved film gate mechanism adapted to maintain the film in flat and even condition while it is transported past the exposure aperture of the aperture plate.

Objects and advantages other than those set forth above will be apparent from the following description when read in connection with the accompanying drawing, in which:

FIG. 1 is a top plan view of a preferred embodiment of the film gate mechanism of this invention;

FIG. 2 is a section view taken substantially along line 2—2 of FIG. 1 and showing the film gate mechanism in a film-guiding position in full lines, and in a film-threading position in dotted lines;

FIG. 3 is a segmental enlarged view partly in section taken substantially along line 3—3 of FIG. 1 with the film gate mechanism in a film-guiding position; and FIG. 4 is a view similar to FIG. 3 showing the film gate mechanism in a film-threading position.

As shown in the drawings, a gate mechanism 5 is pivotally secured by hinges 6 to frame member 7 of some suitable type of photographic apparatus. The gate mechanism 5 has a support member shown as an aperture plate 8 constructed of a relatively thin, non-magnetic material and having a central aperture 9 in register with an optical system, not shown. A plurality of guide pins 11, 12 are provided on aperture plate 8 for guiding a film 13 along plate 8, seen dotted in FIG. 1, and pins 11 are shorter than pins 12 as best seen in FIG. 2 so that they will present a minimum of interference with film 13 during the threading operation. Although gate mechanism 5 is shown guiding a film strip 13, it is readily apparent that any type of web material can be guided thereby, and it should accordingly be understood that applicants have no intention of limiting their invention in an improved gate mechanism to the guiding of film alone.

The gate mechanism 5 is further provided with a thin rectangular pressure plate 14 made of soft iron having a film-guiding portion 15 provided with an opening 16 in register with aperture 9 of plate 8, a recess 17 within which film 13 is guided as best seen in FIG. 2, and a slightly upturned tab 18 by which plate 14 may be moved from an inoperative or film-threading position shown dotted in FIG. 2 to an operative or film-guiding position shown in full lines. The plate 14 further is slightly bent and has a handle portion 19 substantially lying in a plane which is inclined to a plane in which film-guiding portion 15 substantially lies. The handle portion 19 is adapted when pressed by the operator to move plate 14 from the film-guiding position to the film-threading position. The handle 19 is provided with upturned lips 21 disposed between spaced apart L-shaped flange members 22 secured to aperture plate 8 by rivets 23. Each lip 21 has a pin 24 integrally formed therewith adapted to extend through an elongated slot 25 in each flange member 22, and the opposite end thereof is flattened for hingedly securing pressure plate 14 to aperture plate 8 while permitting movement of pin 24 within slot 25. A pair of permanent magnets 26, 27 are secured to the underside of aperture plate 8 and are of any suitable type preferably magnetized so that the poles thereof are on its face adjacent plate 8 for presenting the least magnetic gap and the maximum pulling force tending to clamp plates 8, 14 together. One of the magnets 26 is adapted to cooperate with film-guiding portion 15, and the other magnet 27 is cooperable primarily with handle 19. The part of plate 14 at which film guiding portion 15 joins handle 19 has an edge 28 in engagement with plate 8 which serves as a sliding fulcrum for plate 14 as it is moved between film-guiding and film-threading positions. This edge 28 is constantly urged into engagement with plate 8 by the attractive force developed by one side of magnet 27.

In the operation of this invention, let us assume initially that plate 14 is in the operative or film-guiding position as seen in full lines in FIG. 2. Now if the operator desires to thread a filmstrip through film gate 5, he moves plates 14 into the film-threading position by depressing handle 19 toward aperture plate 8 pivoting plate 14 about edge 28 until handle 19 is substantially in engagement with plate 8 as seen dotted in FIG. 2 and in full lines in FIG. 4. In this film-threading position, the attractive force between magnet 27 and handle 19 exceeds the attractive force existing between magnet 26 and film-guiding portion 15 which is spaced apart therefrom, so that plate 14 is retained in the film-threading position without the need of any external force. Since pin 24 is free to move in slot 25, the entire face of handle 19 is held by magnet 27 in engagement with plate 8 as seen in FIG. 4. Once film 13 has been properly positioned on aperture plate 8 between guides pins 11, 12, the operator depresses tab 18 downwardly moving plate 14 into the film-guiding position, as seen dotted in FIG. 2 and in full lines in FIG. 3. To accomplish this, the operator must exert sufficient force on tab 18 to break the attractive force between handle 19 and magnet 27. As tab 18 is moved closer to aperture plate 8, pressure plate 14 pivots on edge 28 causing handle 19 to move farther away from plate 8, and as the attractive force between portion 15 and magnet 26 increases, the attractive force between handle 19 and magnet 27 decreases. In the film-guiding position, the attractive force between portion 15 and magnet 26 exceeds the attractive force between handle 19 and magnet 27, thereby holding pressure plate 14 in the film-guiding position. Once again, due to the fact that pin 24 is free to move in slot 25, the entire film-guiding portion 15 is held in engagement with plate 8 by magnet 26 and partially by magnet 27 since one edge of portion 15 is adjacent magnet 27.

The pins 24 are slidably movable within elongated slots 25 as plate 14 is moved between film-guiding and film-threading positions so that in each position, portion 15 or handle 19, whichever is in engagement with plate 8, seats completely upon plate 8 so that the greatest possible attractive force exists between the seated part and its corresponding magnet. This is particularly important in the film-guiding position since it is essential for proper film guiding that pressure plate 14 seat completely and properly on aperture plate 8. Furthermore, the pin 24 and slot 25 connection eliminates the necessity for constructing plate 14, lips 21, and flanges 22 to extremely close tolerances.

The invention has been described in detail with particular reference to preferred embodiments thereof, but it will be understood that variations and modifications can be effected within the spirit and scope of the invention as described hereinabove and as defined in the appended claims.

We claim:
1. In a film gate mechanism, the combination comprising:
(a) a support member;
(b) a pressure plate carried by said support member and movable relative thereto between film-threading and film-guiding positions;
(c) said plate having adjacent handle and film-guiding portions of magnetic material joined together and lying in different planes;
(d) said plate having a part along which said handle and film-guiding portions are joined and which provides a sliding pivot for said plate on said support member;
(e) means for connecting one of said portions to said support member to allow said relative movement between said pressure plate and said support; and
(f) magnetic means mounted on said support member and adapted to selectively co-operate with said handle and film-guiding portions to magnetically hold said plate in each of said film-threading and film-guiding positions when it is manually moved to these positions.

2. The invention according to claim 1 wherein the one of said portions connected to said support by said connecting means comprises said handle portion.

3. The invention according to claim 1 wherein said connecting means comprises a pin-and-slot connection.

4. The invention according to claim 1 wherein said part is constantly urged into engagement with said support member by said magnetic means.

5. The invention according to claim 1 wherein said support member has a pair of spaced-apart flanges, each provided with an elongated slot, and said handle portion has a pair of upturned lips disposed between said flanges, a pin which is receivable by one of said slots, and said magnetic means comprises first and second spaced-apart magnets mounted on said support member.

6. The invention according to claim 5 wherein said first magnet is mounted substantially in register with one of said portions, said first magnet further having a portion thereof adjacent said part for magnetically attracting it, and said second magnet is mounted substantially in register with a part of said film-guiding portion.

References Cited in the file of this patent
UNITED STATES PATENTS

| | | |
|---|---|---|
| 1,937,976 | Merle | Dec. 5, 1933 |
| 2,174,020 | Sumner | Sept. 26, 1939 |
| 2,234,714 | Wellman | Mar. 11, 1941 |
| 2,660,919 | Keinath et al. | Dec. 1, 1953 |

FOREIGN PATENTS

| | | |
|---|---|---|
| 826,818 | Germany | Jan. 7, 1952 |